United States Patent
McKenney

(10) Patent No.: US 7,721,291 B2
(45) Date of Patent: May 18, 2010

(54) APPARATUS, SYSTEM, AND METHOD FOR AUTOMATICALLY MINIMIZING REAL-TIME TASK LATENCY AND MAXIMIZING NON-REAL TIME TASK THROUGHPUT

(75) Inventor: Paul Edward McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1615 days.

(21) Appl. No.: 10/966,600

(22) Filed: Oct. 15, 2004

(65) Prior Publication Data

US 2006/0085793 A1 Apr. 20, 2006

(51) Int. Cl.
*G06F 9/46* (2006.01)
(52) U.S. Cl. ..................... 718/104; 718/103
(58) Field of Classification Search .......... 718/102–104
See application file for complete search history.

(56) References Cited

U.S. PATENT DOCUMENTS

| | | | | |
|---|---|---|---|---|
| 5,025,369 A | * | 6/1991 | Schwartz | 718/102 |
| 5,583,987 A | * | 12/1996 | Kobayashi et al. | 714/13 |
| 5,974,439 A | * | 10/1999 | Bollella | 718/104 |
| 6,320,882 B1 | | 11/2001 | Patterson et al. | 370/522 |
| 6,347,362 B1 | | 2/2002 | Schoinas et al. | 711/147 |
| 6,430,659 B1 | | 8/2002 | Cossmann et al. | 711/147 |
| 6,438,655 B1 | * | 8/2002 | Nicol et al. | 711/136 |
| 6,452,866 B2 | | 9/2002 | McLaury | 365/233 |
| 6,668,310 B2 | | 12/2003 | McKenney | 711/147 |
| 6,701,393 B1 | | 3/2004 | Kemeny et al. | 710/40 |
| 2002/0152271 A1 | | 10/2002 | Chafle et al. | 709/204 |
| 2002/0176358 A1 | | 11/2002 | Assa et al. | 370/229 |
| 2003/0120976 A1 | | 6/2003 | Athanassiadis | 714/34 |
| 2004/0031034 A1 | | 2/2004 | Lewis | 718/102 |
| 2005/0223302 A1 | * | 10/2005 | Bono | 714/55 |
| 2006/0253675 A1 | * | 11/2006 | Johannes Bloks | 711/167 |

OTHER PUBLICATIONS

Mike Kravetz et al. "Enhancing Linux Scheduler Scalabitity",, //lse.sourceforge.net/scheduling/ols2001/text2.htm.

(Continued)

*Primary Examiner*—Meng-Ai An
*Assistant Examiner*—Camquy Truong
(74) *Attorney, Agent, or Firm*—Kunzler Needham Massey & Thorpe

(57) ABSTRACT

An apparatus, system, and method are provided for automatically minimizing Real-Time (RT) task latency and maximizing Non-Real Time (NRT) task throughput. The apparatus may include a task manager, a determination module, and optionally a tracking module. The task manager may execute a NRT task configured to obtain exclusive access to a resource within a multi-processor environment. The determination module identifies a RT task within the multi-processor environment that shares exclusive access to the resource with the NRT task. Optionally, the tracking module selectively executes or bypasses a preemption point associated with the NRT task in response to the RT task becoming runnable. Alternatively, the NRT task selectively executes or bypasses a predefined preemption point in response to the RT task becoming runnable. In this manner, RT tasks on any processor of the multi-processor environment meet minimum latency thresholds and NRT tasks automatically provide maximum throughput in the multi-processor environment.

25 Claims, 7 Drawing Sheets

OTHER PUBLICATIONS

Puthiyedath, et al. "The design and implementation of the intel real-tim performance analyzer", Sep. 2002.

Ray Bryant, et al. "Lockmeter: Highly-informative instrumentation for spin locks in the linux kernel" USENIX Association, Oct. 10-14, 2000.

Kevin Dankwardt, "A simple model of real-time applications", .linuxdevices.com/articles/AT5709748392.html.

Anzinger, et al. "Design of a fully preemptable linux kernel", linuxdevices.com/articles/AT4185744181.html.

Kevin Morgan, "Can Linux be a real-time operating system?", linuxdevices.com/articles/AT5152980814.html.

"Montavista unveils transparent real0time scheduler for linux" May 4, 2000, linuxdevices.com/news/NS8778096476.html.

"Symmetrical Multiprocessor (SMP) concepts and architecture", AIX version 3.2 and 4, Performance Tuning Guide; //nscb.upenn.edu/aix4.3html/aixbman/prftungd/smpcon.htm.

Rick Lindsley, "Process Scheduling in 2.5 Linux" IBM Linux Technology Center, May 22, 2003, 124.ibm.com/linux/presentations/misc/ricklind_osu/html/img0.html.

Chris Clark, "Running Linux applications in an embedded, real-time environment", 2000 Q3 (dedicated-systems.com ), p. 13-17.

"Scheduling in UNIX and Linux", kernelnewbies.org/documents/schedule/.

CJ Ganier et al. "Real Time", version 1.1: May 27, 2004, //cnx.rice.edu/content/m11994/latest/.

* cited by examiner

APPARATUS, SYSTEM, AND METHOD FOR AUTOMATICALLY MINIMIZING REAL-TIME TASK LATENCY AND MAXIMIZING NON-REAL TIME TASK THROUGHPUT

BACKGROUND OF THE INVENTION

1. Field of the Invention

The invention relates to multi-processor computing. Specifically, the invention relates to apparatus, systems, and methods for automatically minimizing real-time task latency and maximizing non-real time task throughput.

2. Description of the Related Art

Mainstream computer systems are currently moving from conventional single processor architectures, also known as Uniprocessor (UP), to multi-processor architectures. In particular, Symmetric Multi-Processor (SMP) architectures or environments are becoming more widely used in various fields. In an SMP environment, typically, hardware computing resources such as memory, communications bus, I/O devices, and the Operating System (OS) are shared by two or more processors. The multiple processors cooperate as peers each having an equal ability to service tasks assigned by the OS.

A multi-processor environment or SMP system can be implemented with multiple physical processors connected to a common bus. Alternatively, due to advances in processor technology a single physical processor may be used but treated as multiple logical processors by the OS and all other computer system components. One example of this technology is hyperthreading. As used herein, references to SMP system(s) and multi-processor environment(s) refers to any computer system that includes a plurality of physical and/or logical processors. Similarly, references to "processor" include both physical processors and logical processors.

SMP systems are being used both for general purpose computing such as desktop PCs and for more specialized applications such as embedded computing systems. Operating systems for the general purpose and embedded computing systems are adapting to most efficiently service both general desktop computing needs and specialized embedded computing needs. One example of this adaptation is the ability of a single SMP OS to properly manage both Non-Real Time (NRT) tasks and Real-Time (RT) tasks. As used herein, the term "task" refers to the smallest portion of a software program that the OS can switch between a waiting or blocked state and a running state in which the task executes on a particular processor. Tasks can come from a single software program or a plurality of software programs and typically include portions of the OS.

As used herein, a NRT task refers to software code that does not have explicit time constraints for when computing services are to be provided to the task. Conversely, RT tasks are tasks for which the task has a predefined maximum threshold for delay between requesting a service from the computer system and having the request fulfilled. Failure to service the RT task within the threshold can cause serious failure of the task and/or systems managed by the RT task. Furthermore, RT tasks include both hard real time tasks and soft real time tasks. Hard real time tasks require an absolute guarantee of response time below the maximum threshold. Soft real time tasks require a very high probability that the response time is below the maximum threshold, but not an absolute guarantee.

Where the threshold is set to define a NRT task or a RT task depends on the context. For a mission critical task, such as respiratory oxygen content in a hospital patient, the threshold could be measured in tens of microseconds. Such a critical task is one example of a hard real time task. For other RT tasks, soft real time tasks, the threshold could be measured in minutes, such as a weather station temperature sampling task. Another soft real time task example is a real time video or audio processing task. Failure to meet the maximum threshold for response time may result in detectable "skips" or degradation in quality, but not critical failures such as possible death.

Typically, NRT tasks are tasks that involve user interaction where long delays in response to user inputs results in a poor user experience but no loss of data, functionality, or a critical failure. However, because classifying a task depends so much on the context, NRT tasks and RT tasks are typically classified as such for the OS by the software developer. Generally, RT tasks have a very low service threshold and NRT tasks have a comparatively high service threshold.

The delay between when a task requests a service from the OS and when the service is provided is referred to as latency. Typically, the requested service is the assignment of a processor to execute the task. The service threshold defines a maximum tolerable latency for the task. As used herein, the term "latency" or "task latency" refers to the time between when the task requests a service from the OS and when the service is provided. The service may include assignment of a processor for task execution, exclusive access to a resource, and the like. Task latency typically includes other more specific latencies well known to those of skill in the art such as scheduling latency, task switching latency, and the like.

Multiple factors affect task latency. It is well known that modern OSs constantly change the task assigned to a particular processor in order to provide multitasking functionality. Consequently, the number of tasks managed by the OS can lengthen the task latency due to the increased overhead in handling each additional task. However, due to the critical nature of RT tasks, general purpose OSs have been modified to service the task latency requirements of the most demanding RT tasks in order to handle a worst-case scenario and ensure that the worst-case task latency still meets the RT task requirements.

In certain cases, real-time specific OSs (RTOSs) have been developed. Unfortunately, the RTOSs favor the RT tasks over the NRT tasks. Consequently, a NRT task may experience poor responsiveness on an RTOS system. Often, if the RTOS support NRT tasks, the NRT task is so delayed in responding to user inputs that the user notices a delay in response to a user-initiated action. The responsiveness of a NRT task in an OS is referred to herein as task throughput. Task throughput represents how quickly a task is able to complete a command and provide a response to the user. Task throughput also includes the number of units of work a task can complete in a given time period.

If NRT tasks and RT tasks are run together on the same computer system, the optimizations for servicing RT tasks adversely affect NRT task throughput. In certain cases, the NRT task throughput is affected regardless of whether any RT tasks are running on the system. Similarly, conventional optimizations to improve NRT throughput can adversely affect RT task latency. Consequently, the industry has experienced a trade-off in OSs attempting to service both RT tasks and NRT tasks. Until the present invention, the industry has been unable to satisfactorily minimize RT task latency and maximize NRT task throughput automatically.

Typically, NRT task throughput is sacrificed in favor of RT task latency. Currently, the OS scheduling algorithm is optimized such that RT tasks, if present, are assigned a processor ahead of NRT tasks. Consequently, in a typical Uniprocessor (UP) system, NRT tasks are generally preempted if a RT task becomes runnable. Preemption means the task currently executing on the processor is halted before the task has reached a natural termination point. The task is forced to wait while a higher priority task, such as a RT task, is assigned a processor. However, as noted above, under this approach, as the number of RT tasks increases the NRT task throughput decreases. Examples of these scheduling optimizations include a Priority Level Scheduler (PLS) and Multi-queue Scheduler (MQS).

The problem of optimizing the OS to minimize RT task latency and maximize NRT throughput is even more difficult in an SMP system. In a UP system, RT tasks can simply be tracked and provided priority over runnable NRT tasks. However, in SMP systems, there is currently no efficient way to determine whether a RT task exists on a processor other than the processor executing a NRT task.

In addition, in an SMP system the concurrent nature of multiple processors (each executing a different task) sharing resources such as data structures, memory, devices, and the like requires that access to the shared resources be controlled. The access to the resources is controlled such that only one processor and its currently executing task, are permitted to access the resource at a given time. This process of controlling access is referred to as serialization.

Serialization is particularly desirable to preserve data integrity when multiple tasks/processors can modify data in a shared resource. Preempting a task while writing to a shared resource can corrupt the data. Consequently, serialization should provide exclusive access for the task requesting the shared resource and exclude preemption. If one task has access to the resource, all other tasks are excluded from con accessing the resource until the one task has finished. Exclusive access is provided atomically meaning a task executes a single command to obtain access and is either successful or not, there is no opportunity to preempt the task while requesting the exclusive access.

Generally, serialization of SMP tasks to shared resources is controlled by locks. If a task desires exclusive access to a resource, the task requests the lock. If the lock is not held by any other task, the lock is atomically provided to the requesting task. If the lock is held by another task, the requesting task often enters a loop in which the task continually requests the lock until the lock becomes free. Once a task holds a lock, the task modifies or otherwise uses the shared resource in some manner and then releases the lock. Typically, a lock is implemented using a boolean value, False if the lock is available and True if the lock is being held.

FIG. 1 illustrates a conventional multi-processor environment 100 with NRT tasks 102 and RT tasks 104 that share exclusive access to a common resource 106. The environment 100 includes a memory 108, a plurality of processors 110, also referred to as Central Processing Units (CPUs) 110, and a communications bus 112. The memory 108, CPUs 110, and communications bus 112 are well known. The CPUs 110 are identified by subscripts 1, 2, . . . n. Those of skill in the art will recognize various different hardware configurations for a multi-processor environment 100.

The memory 108 includes a set of executable code that includes a multi-processor operating system 114 such as an SMP OS 114 and a data section 116. The SMP OS 114 includes a task manager 118 also referred to as a scheduler 118 and a runqueue 120 associated with each CPU 110. The runqueue 120 include subscripts 1, 2, . . . n corresponding to the associated CPU 110. The data section 116 includes task-specific data as well as data structures shared by the tasks. Certain exclusive access data structures are controlled by locks 122. Different locks 122 are represented using alphabetic identifiers and an arrow 124 to the associated resource 106, such as a data structure.

By way of example, in the current multi-processor environment 100, CPU1 110 is executing a NRT task 102 that has acquired the lock A 122a for resource 106. At substantially the same time, a RT task 104 on CPUn 110 has become runnable and begins to run on CPUn. Furthermore, one of the first instructions executed by RT task 104 is to acquire lock A 122b.

This presents a problem. The task latency will be increased because the NRT task 102 is holding lock A 122a which the RT task 104 needs and the NRT task 102 is not preemptable. Furthermore, depending on which type of lock 122 NRT task 102 is holding interrupts could be disabled. This means that the RT task 104 must wait for the NRT task 102 to release the lock before the RT task 104 can perform its work. In addition, if interrupts are enabled, an interrupt arrive while the NRT task 102 holds the lock. The interrupt may be long-running such that the interrupt also delays the release of the lock by NRT task 102. The delays caused by the NRT task 102 and/or interrupts are generally unacceptable and the RT task latency maximum threshold is consequently exceeded.

In a conventional multi-processor environment 100, the solution is to defer to the needs of the RT task 104. One proposed solution is to include multiple preemption points 126 in the code of the NRT task 102. Alternatively, if the NRT task 102 is executing object code in the kernel of the OS, the preemption points 126 are in the kernel. The preemption point 126 is executed indiscriminately. There is currently no way for a NRT task 102 to avoid the preemption point 126 and its associated delay.

A preemption point 126 is a predefined point in the object code when a developer has determined that the NRT task 102 can voluntarily give up ownership of the CPU1 110. Generally, as part of executing the preemption point 1126 the NRT task 102 will also release any locks 122 being held. Typically, the preemption points 126 are in the kernel object code and the NRT task 102 is forced to give up the CPU1 110.

Preemption points 126 ensure that the most time added to the RT task latency is the time between preemption points 126. RT tasks 104 are not delayed by a NRT task 102 holding a lock 122 too long. Preemption points 126 also introduce overhead as the NRT task 102 performs steps to preserve its state, release any locks 122, sleep, and then resume operations after the preemption point 126.

Unfortunately, indiscriminate execution of preemption points 126 incurs this overhead delay even if there are no RT tasks 104 in the environment 100. The overhead delays caused by mandatory preemption points 126 unnecessarily reduce the NRT task throughput.

From the foregoing discussion, it should be apparent that a need exists for an apparatus, system, and method for automatically minimizing RT task latency and maximizing NRT task throughput in a multi-processor environment. Beneficially, such an apparatus, system, and method would conditionally execute preemption points in response to the presence or absence of a runnable RT task in the multi-processor environment. In addition, the apparatus, system, and method would automatically and optimally handle both RT tasks and NRT tasks, incur minimal processing overhead, and prevent shared resource contention between NRT tasks and RT tasks.

SUMMARY OF THE INVENTION

The present invention has been developed in response to the present state of the art, and in particular, in response to the problems and needs in the art that have not yet been met for automatically minimizing real-time (RT) task latency and maximizing non-real time (NRT) task throughput in a multi-processor environment. Accordingly, the present invention has been developed to provide an apparatus, system, and method for automatically minimizing real-time (RT) task latency and maximizing non-real time (NRT) task throughput in a multi-processor environment that overcomes many or all of the above-discussed shortcomings in the art.

An apparatus according to the present invention includes a task manager, and a determination module. The task manager executes a NRT task in a multi-processor environment. The NRT task is configured to obtain exclusive access to a resource. The determination module is configured to identify a RT task within the multi-processor environment. The RT task may be executing on any processor and shares exclusive access to the resource with the NRT task. In one embodiment, the NRT task may be configured to selectively execute a preemption point in response to the RT task becoming runnable. The NRT task may use various techniques to determine whether the RT task is runnable, discussed in more detail below. If the RT task is not runnable, the NRT task may bypass the preemption point. The preemption point may be part of the NRT task or an operating system executing the NRT task.

Preferably, execution of the preemption point causes the NRT task to release any exclusive access the NRT task has to the resource such that the RT task may obtain exclusive access to the resource. In one embodiment, a resource manager allocates the resource to the RT task in response to execution of the preemption point for the NRT task.

In certain embodiments, the NRT task recognizes a runnable RT task by way of a tracking module. The tracking module may increment or decrement a global indicator accessible to tasks in the multi-processor environment. The global indicator is incremented in response to an identified runnable RT task and decremented in response to a blocked RT task. The NRT task executes the preemption point in response to the global indicator being nonzero and bypasses the preemption point in response to the global indicator being zero. Alternatively, the tracking module may be configured to selectively execute or bypass the preemption point for the NRT task.

As used herein, the term "indicator" means any structure, data, or value capable of conveying information by virtue of its existence or nonexistence or the presence or absence of a value for the indicator including a quantity or count. Examples of indicators include counters, boolean variables, flags, bits in a bitmap, and the like. For clarity in the embodiments described below, reference is made hereinafter to the term "counter" as one example of an "indicator" within the scope of the present invention. Those of skill in the art will recognize that any indicators, not just those embodied as counters, may be used with the present invention. The term "counter" is used as one example of an "indicator" regardless of the adjectives such as global or processor-specific used with the term.

In another embodiment, the tracking module may increment or decrement a processor-specific indicator accessible to tasks on a particular processor for each processor in a multi-processor environment. If a RT task becomes runnable or blocked on a particular processor, the processor-specific indicator, is respectively incremented or decremented. In addition, a global indicator is maintained which is incremented if any processor-specific indicator is incremented to one and decremented if any processor specific indicator is decremented to zero. The processor-specific indicator for a processor is also decremented if a RT task is moved to another processor. The preemption point of a NRT task executing on a processor is executed if the processor-specific indicator or the global indicator is non-zero. The preemption point of a NRT task executing on a processor is bypassed if the processor-specific indicator and the global indicator are zero.

In yet another embodiment, the tracking module may reference a global data structure such as a runnable RT task queue. The presence of a task in the runnable RT task queue indicates that a runnable RT task exists in the multi-processor environment. Accordingly, the tracking module will execute the preemption point. If no tasks are in the runnable RT task queue, the tracking module will bypass a preemption point for the NRT task. In another embodiment, the runnable RT task queue may be part of a generic run queue. Alternatively, the tracking module references a plurality of runnable RT task queues, each associated with a specific processor. Again the presence or absence of a task on any of the plurality of runnable RT task queues is used to selectively execute or bypass the preemption point for the NRT task.

In certain embodiments, the NRT and/or tracking module may determine whether runnable RT tasks are present in a multi-processor environment by referencing the shared resource. In one embodiment, the RT task sets an indicator associated with the resource. The indicator signals a NRT task to execute the preemption point because a RT task is using or will use the resource very soon.

A method of the present invention is also presented for automatically minimizing real-time (RT) task latency and maximizing non-real time (NRT) task throughput in a multi-processor environment. In one embodiment, the method includes executing a NRT task in a multi-processor environment, the NRT task configured to obtain exclusive access to a resource. The method identifies a RT task within the multi-processor environment, the RT task sharing exclusive access to the resource with the NRT task. Lastly, the method selectively executes a preemption point for the NRT task in response to the RT task becoming runnable.

The present invention also includes embodiments arranged as a system, alternative apparatus, additional method steps, and machine-readable instructions that comprise substantially the same functionality as the components and steps described above in relation to the apparatus and method. The present invention provides a solution for minimizing RT task latency and maximizing NRT throughput that is automatic/autonomic, incurs minimal processing overhead, and prevents shared resource contention between NRT tasks and RT tasks in a multi-processor environment. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
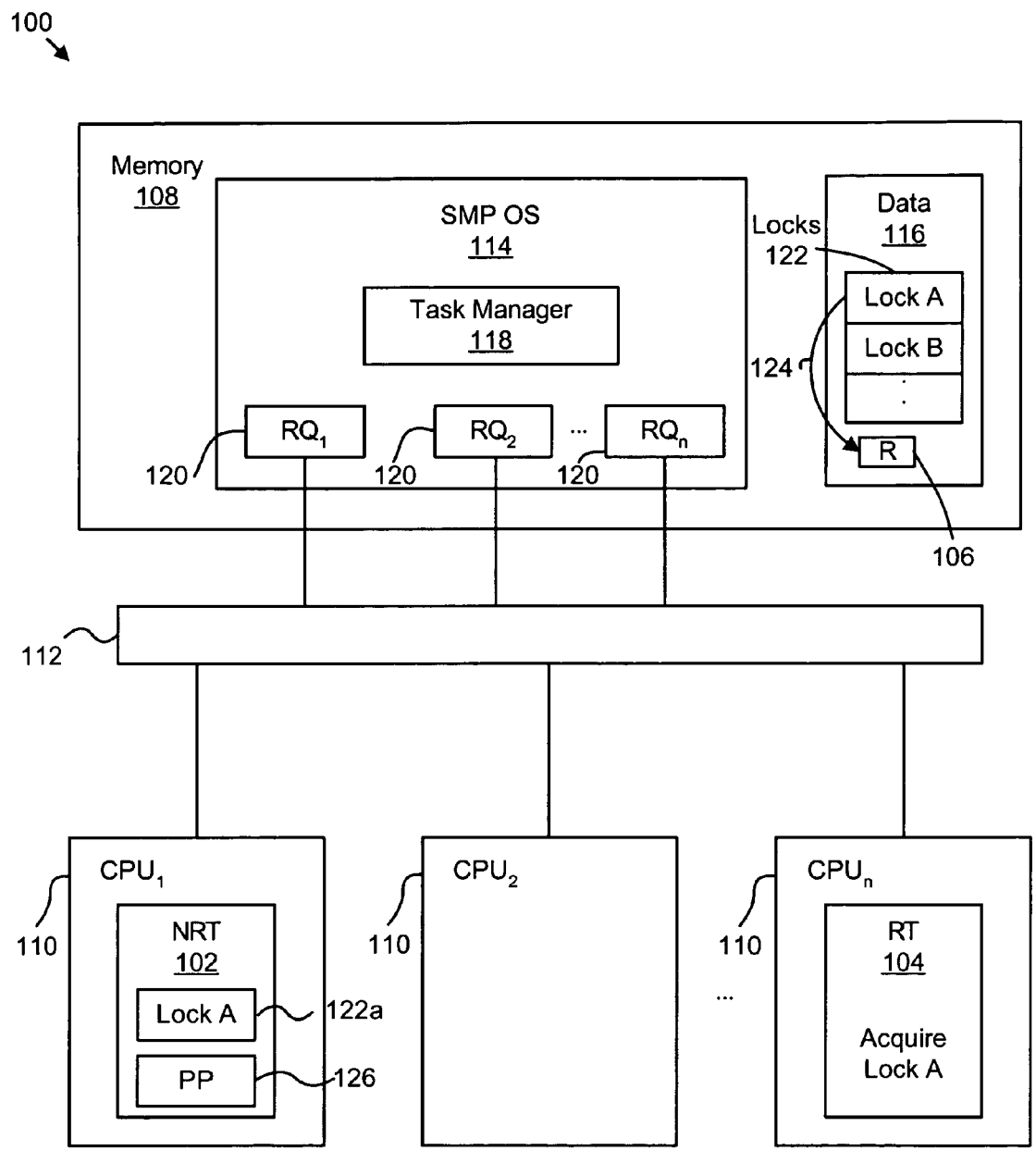
FIG. 1 is a schematic block diagram illustrating a conventional multi-processor environment with NRT tasks and RT tasks that share exclusive access to a common resource.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
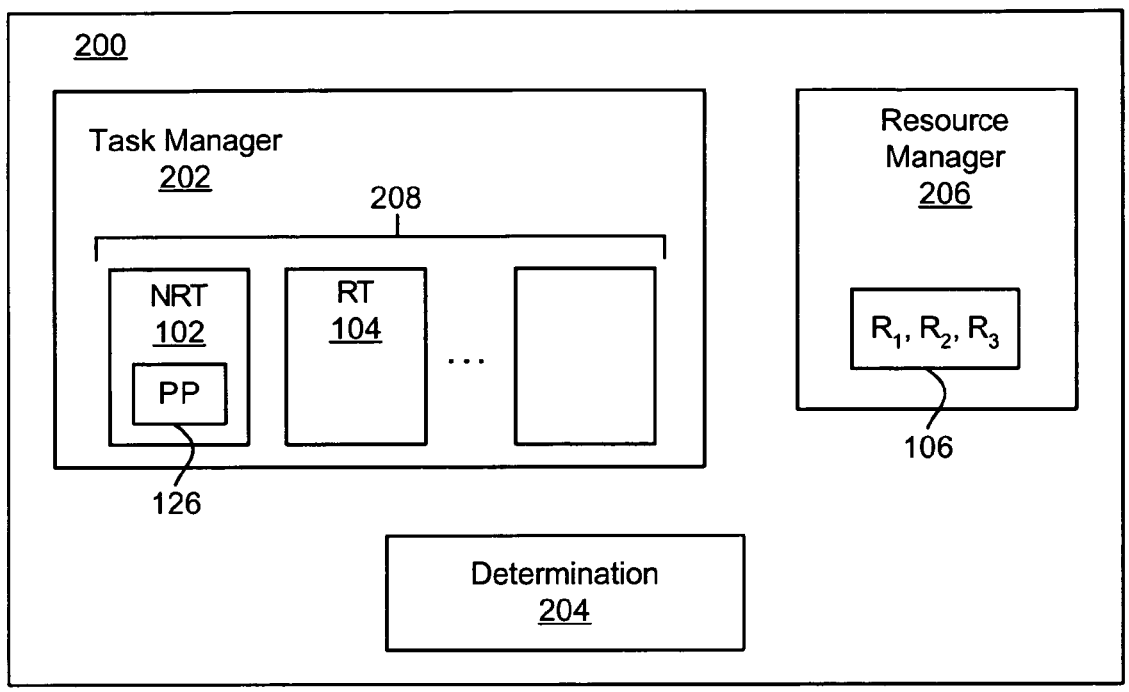
FIG. 2 is a logical block diagram illustrating one embodiment of the present invention.

FIG. 2 illustrates a logical block diagram of an apparatus 200 for minimizing RT task latency and maximizing NRT throughput in a multi-processor environment 100 (See FIG. 1). The apparatus 200 includes a task manager 202, a determination module 204, and optionally a resource manager 206.

The task manager 202 reviews a list of runnable tasks 208 and determines which task to provide to a processor 110 (See FIG. 1) to allow execution of the task. Those of skill in the art will recognize that various algorithms exist for determining which task to assign to an available CPU 110. All such algorithms are considered within the scope of this invention. Once CPU 110 assignments have been made the task manager 202 preempts the currently running tasks and switches the assigned processors to the newly selected tasks. Preferably, the task manager 202 is configured to execute a NRT task 102 (See FIG. 1). The NRT task 102 is configured to obtain exclusive access to a shared resource 106, such as R1. As described above, this is typically managed by holding a lock associated with the shared resource 106 (i.e., R1).

The determination module 204 identifies a RT task 104. The determination module 204 is specifically configured to determine if a RT task 104 shares or can potentially share exclusive access to the same resource as the NRT task 102. Those of skill in the art will recognize that the determination module 204 may strictly (liberal approach) or loosely (conservative approach) determine whether a RT task 104 shares exclusive access to the same resource as the NRT task 102.

In one embodiment, the determination module 204 may review the locks 122 currently held by the NRT task 102. This may be done, for example, by referencing characteristics of the NRT task 102. Next, based on the characteristics of the RT task 104, the determination module 204 may determine that there is a high likelihood that the NRT task 102 and the RT task 104 will contend for the same locks 122. For example, if the RT task 104 is a kernel task, then the lock contention likelihood may be sufficiently high to identify the RT task 104 for consideration at a preemption point 126 for the NRT task 102.

Alternatively, if the NRT task 102 holds kernel locks 122, the determination module 204 may simply presume that the RT task may also want kernel locks 122. Consequently, the determination module 204 may identify the RT task 104 for consideration at a preemption point 126 for the NRT task 102. In yet another alternative embodiment, the determination module 204 may search for any RT task 104 on any CPU 110. If a RT task 104 is found, that RT task 104 is identified by the determination module 204.

With the RT task 104 identified, the NRT task 102 is preferably configured to execute a preemption point 126 if the RT task is runnable. In one embodiment, the RT task 104 may quickly reference a characteristic of the RT task 104 to determine whether the RT task 104 is runnable. As mentioned above, execution of the preemption point 126 preferably releases any locks 122 held and frees a CPU 110 for use by another task, such as the RT task 104.

A task is runnable if the task is fully prepared to use time allotted to it for execution on a CPU 110. If a task is waiting for some kind of input, feedback, or condition such as passage of time, the task is said to be blocked. Additional techniques to determine whether the RT task 104 is runnable or blocked are described below.

Blocked RT tasks, although present, can not execute on a CPU 110 and thus can not benefit from a NRT task 102 executing a preemption point 126. Consequently, if a RT task 104 is blocked, the NRT task 102 bypasses the preemption point 126 and continues to hold any locks 122 previously held. Holding the locks 122 allows the NRT task 102 to get more work done. Consequently, the NRT task 102 throughput is increased.

By checking the runnable characteristic of an identified RT task 104 on any CPU 110 in the multi-processor environment, the NRT task 102 can conditionally execute or bypass the preemption point 126. Consequently, if runnable RT tasks 104 are on any of the CPUs 110, the RT task 104 is quickly serviced because the preemption point 126 is executed. The worst-case latency is the time between preemption points 126 plus a minor delay to check for the runnable state of the identified RT task 104. However, if no runnable RT tasks 104 are in the multi-processor environment, the NRT task 102 is permitted to continue execution free from preemption and overhead involved in releasing shared locks. In this manner, RT task latency is minimized and NRT task throughput is maximized automatically.

Optionally, the apparatus 200 includes a resource manager 206. The resource manager 206 manages access to shared resources between tasks. In particular, the resource manager 206 may manage locks 122 for shared resources. Consequently, in one embodiment, once the NRT task 102 executes the preemption point 126, the resource manager 206 may allocate the locks 122 or other shared resources (released by the NRT task 102) to the identified RT task 104. Typically, locks 122 are transferred by the RT task 104 constantly asking for the lock 122, "Spinning" for the lock. Where types of locks other than spinlocks are shared, the resource manager 206 may facilitate transfer of exclusive access to the shared resource to the RT task 104.

Figure 3:
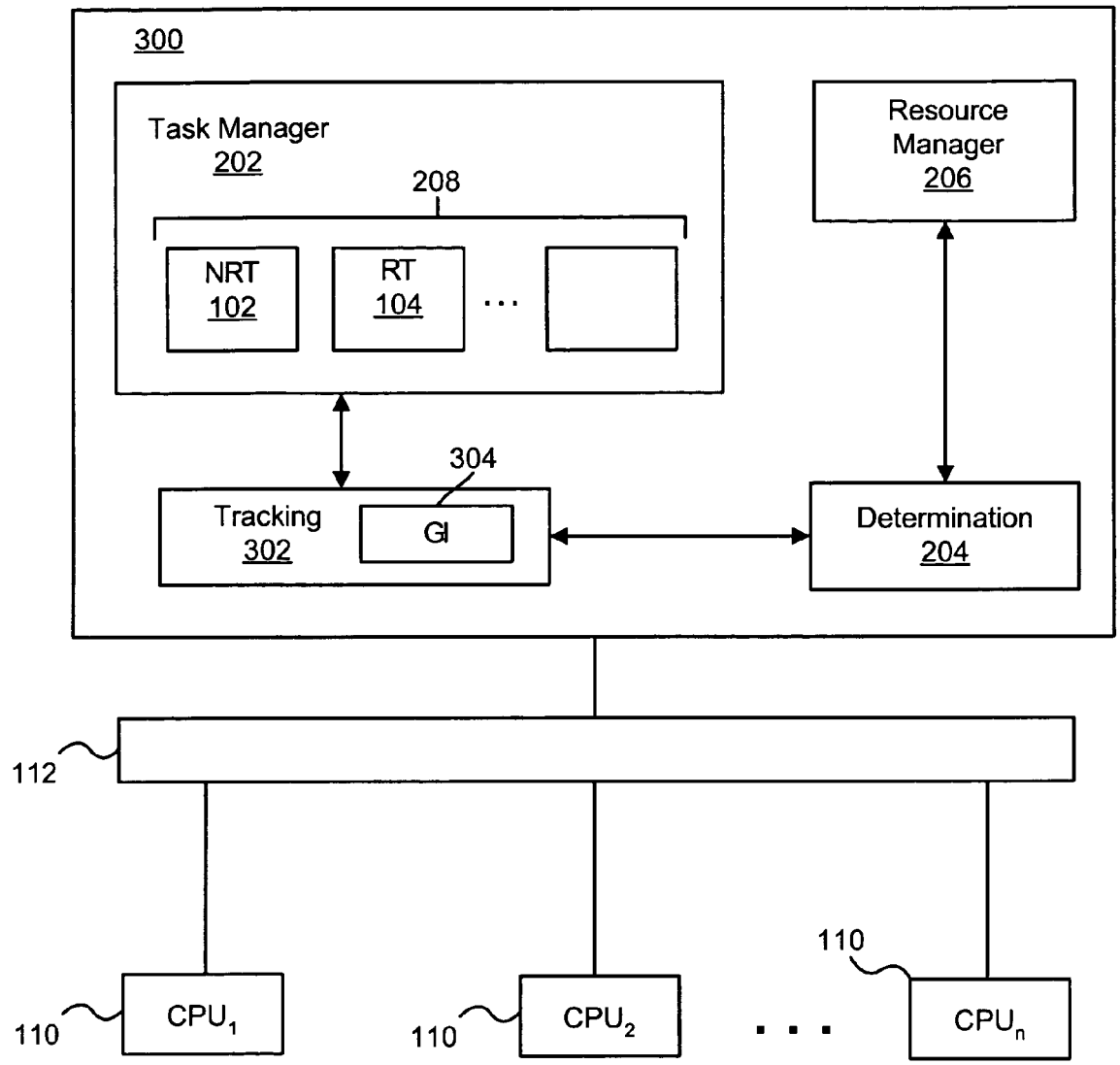
FIG. 3 is a schematic block diagram illustrating another embodiment of an apparatus in accordance with the present invention.

FIG. 3 illustrates an apparatus 300 according to one embodiment for minimizing RT task latency and maximizing NRT throughput in a multi-processor environment 100 (See FIG. 1). Reference will now be made directly to FIG. 3 and indirectly to FIGS. 1 and 2. The apparatus 300 communicates via the bus 112 to a plurality of CPUs 1-n 110. The apparatus 300 includes a task manager 202, a determination module 204, and a resource module 206 which are substantially the same as those described in relation to FIG. 2.

In addition, the apparatus 300 includes a tracking module 302. The tracking module 302, in certain embodiments, may selectively execute the preemption point 126 for the NRT task 102. If the RT task 104 is runnable, the tracking module 302 executes the preemption point 126. If the RT task is blocked for any reason, the tracking module 302 bypasses the preemption point 126.

In certain embodiments, placing the logic to conditionally determine whether to execute a preemption point 126 with the tracking module 302 may be desirable. For example, rather than having each NRT task 102 evaluate the condition, a central set of code may evaluate the condition for all NRT tasks 102, as needed.

In one embodiment, the tracking module 302 may be implemented as part of a scheduler or task manager for an OS such as Linux. The preemption points 126 may be within kernel code. The kernel code may simply make a function call to the tracking module 302 to evaluate whether or not to execute the preemption point 126.

The tracking module 302 illustrated implements one of many techniques that may be used to evaluate whether execution of the preemption point 126 is appropriate. In one embodiment, the tracking module 302 maintains a global counter (GC) 304. Preferably, the GC 304 is a positive integer counter accessible to each task in the multi-processor environment.

The tracking module 302 keeps track of changes in the states of tasks executing on any of the CPUs 110. In one embodiment, the tracking module 302 may monitor the types of tasks on a global runqueue or on cpu-specific runqueues 120. Those of skill in the art will readily recognize that how this monitoring is performed depends in part on the implementation of the runqueues.

In one embodiment, a NRT global runqueue having only NRT task 102 members and a RT global runqueue having only RT task 104 members may exist. In such an embodiment, the tracking module 302 may simply monitor the RT global runqueue for any members, provided such a check can be done efficiently. Alternatively, if there are separate cpu-specific runqueues 120 for NRT tasks 102 and RT tasks 104, the tracking module 302 may monitor cpu-specific RT runqueues for any members. Typically, the NRT tasks 102 and RT tasks 104 are maintained in the same runqueue, consequently in one embodiment, the tasks 102/104 in the runqueue are reviewed to determine what type of task is present.

Regardless of how runnable RT tasks 104 are detected, if a RT task 104 becomes runnable (typically determined by its presence in a runqueue), the tracking module 302 increments the GC 304. If a RT task 104 becomes blocked or terminates, the tracking module 302 decrements the GC 304. Furthermore, as described in more detail below, detection of RT tasks 104 on specific CPUs 110 may cause cpu-specific counters to be adjusted.

Preferably, the tasks have access to the GC 304 such that the NRT task 102 may quickly read the GC 304 to determine whether or not to execute the preemption point 126. Alternatively, the tracking module 302 references the GC 304 to determine whether to execute the preemption point 126. For example, the NRT task 102 may query the tracking module 302 to determine whether to execute the preemption point 126.

Regardless of whether the NRT task 102 or the tracking module 302 makes the decision regarding executing the preemption point 126, in one embodiment, if the GC 304 is not zero the preemption point 126 is executed. A nonzero GC 304 indicates that somewhere in the multi-processor environment a RT task 104 is ready to run and either clearly does share exclusive access to a resource 106 with the NRT task 102 or potentially shares exclusive access to the resource 106. If the GC 304 is zero, the preemption point 126 is bypassed. A zero GC 304 indicates that there are currently no runnable RT tasks 104 in the multi-processor environment.

Those of skill in the art will recognize that tracking RT tasks 104 that are runnable and blocked as their state changes using a global counter is but one of many ways the pertinent information regarding the state of RT tasks 104 in the multi-processor environment can be obtained. The scope of the present invention is not limited to the few exemplary embodiments described herein for identifying RT tasks 104 among a plurality of CPUs or for determining whether a RT task 104 in the environment is runnable or blocked. Other techniques are also contemplated such as the tracking module 302 scanning all tasks in the environment as needed to determine whether a RT task 104 is runnable and present that may require exclusive access to resources 106 shared with the NRT task.

Figure 4A:
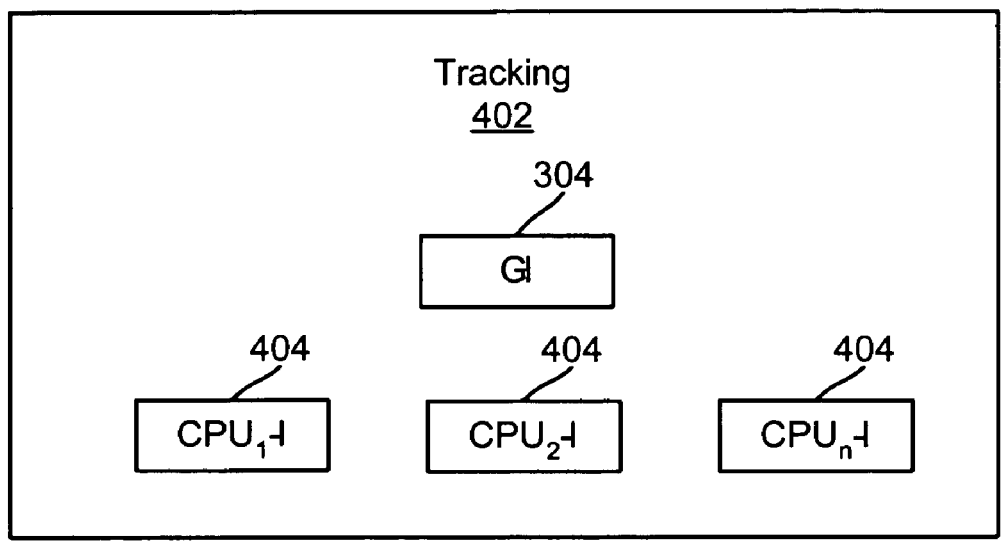
FIG. 4A is a schematic block diagram illustrating one embodiment of tracking module in accordance with the present invention.
Figure 4B:
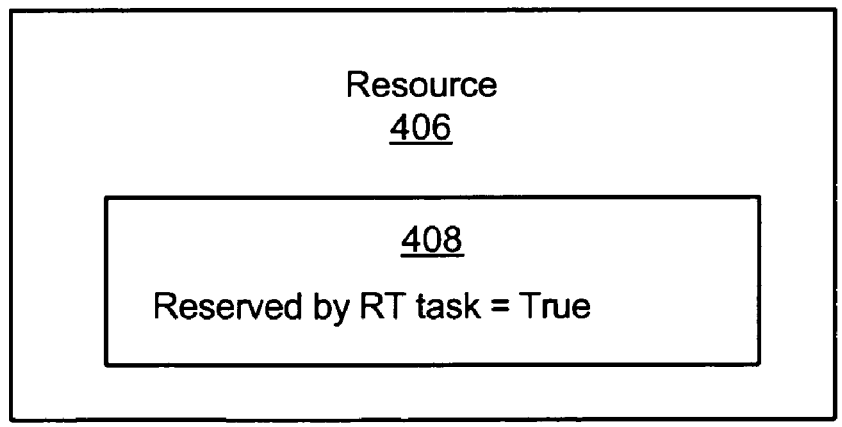
FIG. 4B is a schematic block diagram illustrating one embodiment of a resource shared by a NRT task and a RT task in accordance with the present invention.

FIGS. 4A and 4B illustrate alternative embodiments for the tracking module 302 described in relation to FIG. 3. In FIG. 4A, the tracking module 402 maintains the GC 304 and performs substantially the same functionality as the tracking module 302 in FIG. 3. One difference is the level of granularity for the counters.

In addition to a GC 304, the tracking module 402 may maintain processor-specific counters 404. The processor-specific counters 404 are designated by subscripts 1, 2, . . . n and correspond to the plurality of CPUs 110 1, 2, 3, . . . n as illustrated in FIG. 3. The processor-specific counters 404 may reside in a central location such as in the tracking module 402. Alternatively, the processor-specific counters 404 may reside in the cache of the associated processor 110.

In the embodiment of FIG. 4a, RT tasks 104 are tracked at the individual CPU level. For a first CPU/processor 110, if a runnable RT task 104 is identified on the first processor 110, the processor-specific counter 404 is incremented. Similarly, if a runnable RT task 104 is blocked on the first processor 110 or is moved to a second processor 110, the processor-specific counter 404 for the first processor 110 is decremented.

In one embodiment, the GC 304 is still incremented and decremented such that the status of RT tasks 104 on the processors 110 is tracked. In other words, the local processor-specific counter 404 identifies how many RT tasks 104 are actually runnable on that processor 110. While, the GC 304 maintains whether any processor 110 still includes at least one RT task 104. Consequently, the tracking module 402 increments the GC 304 if a processor-specific counter 404 is incremented to one. The tracking module 402 decrements the GC 304 if a processor-specific counter 404 is decremented to zero.

The tracking module 402 may be configured to check both the local processor-specific counter 404 and the GC 304. Alternatively, the NRT task 102 itself may include logic to perform this check. If the processor-specific counter 404 for the processor 110 that the NRT task 102 is executing on is nonzero, the preemption point 126 is executed. In addition, if the GC 304 is nonzero, the preemption point 126 is executed. If the processor-specific counter 404 is zero and the GC 304 is nonzero, there is a RT task 104 on a different processor 110. Consequently, the preemption point 126 should be executed to enable the RT task 104 to be serviced and obtain any needed locks 122.

Similarly, if the processor-specific counter 404 for the processor 110 that the NRT task 102 is executing on is zero and the GC 304 is zero, the preemption point 126 is bypassed. If the processor-specific counter 404 is zero and the GC 304 is zero, there are no runnable RT tasks 104 in the multi-processor environment.

Advantageously, using a GC 304 and processor-specific counters 404 may reduce cache thrashing between processors 110. However, this implementation may not be as efficient when multiple RT tasks 104 are on each processor 110.

Referring now to FIG. 4B, the information that a runnable RT task 104 con exists and is sharing exclusive access to a shared resource may be provided in yet another embodiment. FIG. 4B illustrates a shared resource 406. The shared resource 406 may comprise a lock 122, token, a header for another shared data structure, a particular buffer associated with a shared device, or the like.

The shared resource 406 includes an indicator 408. The indicator 408 signals a NRT task 102 that obtains exclusive use of the resource 406 to execute preemption points 126. In one embodiment, only a RT task 104 can set the indicator 408. Consequently, the indicator 408 may comprise a simple flag that is set and cleared by RT tasks 104.

Preferably, the RT task 104 obtains exclusive access to the resource 406. Before becoming blocked, the RT task 104 sets the indicator to True. The RT task 104 then blocks and the resource 406 is released. Later, when a NRT task 102 obtains exclusive access to the resource 406, the NRT task 102 may simply reference the indicator 408 to determine whether to execute the preemption point 126. If the indicator 408 is True, the resource 406 is reserved and the preemption point 126 is executed. If the indicator 408 is False, the resource 406 is not reserved. The NRT task 102 bypasses the preemption point 126 and can retain exclusive use of the resource 406.

Figure 5:
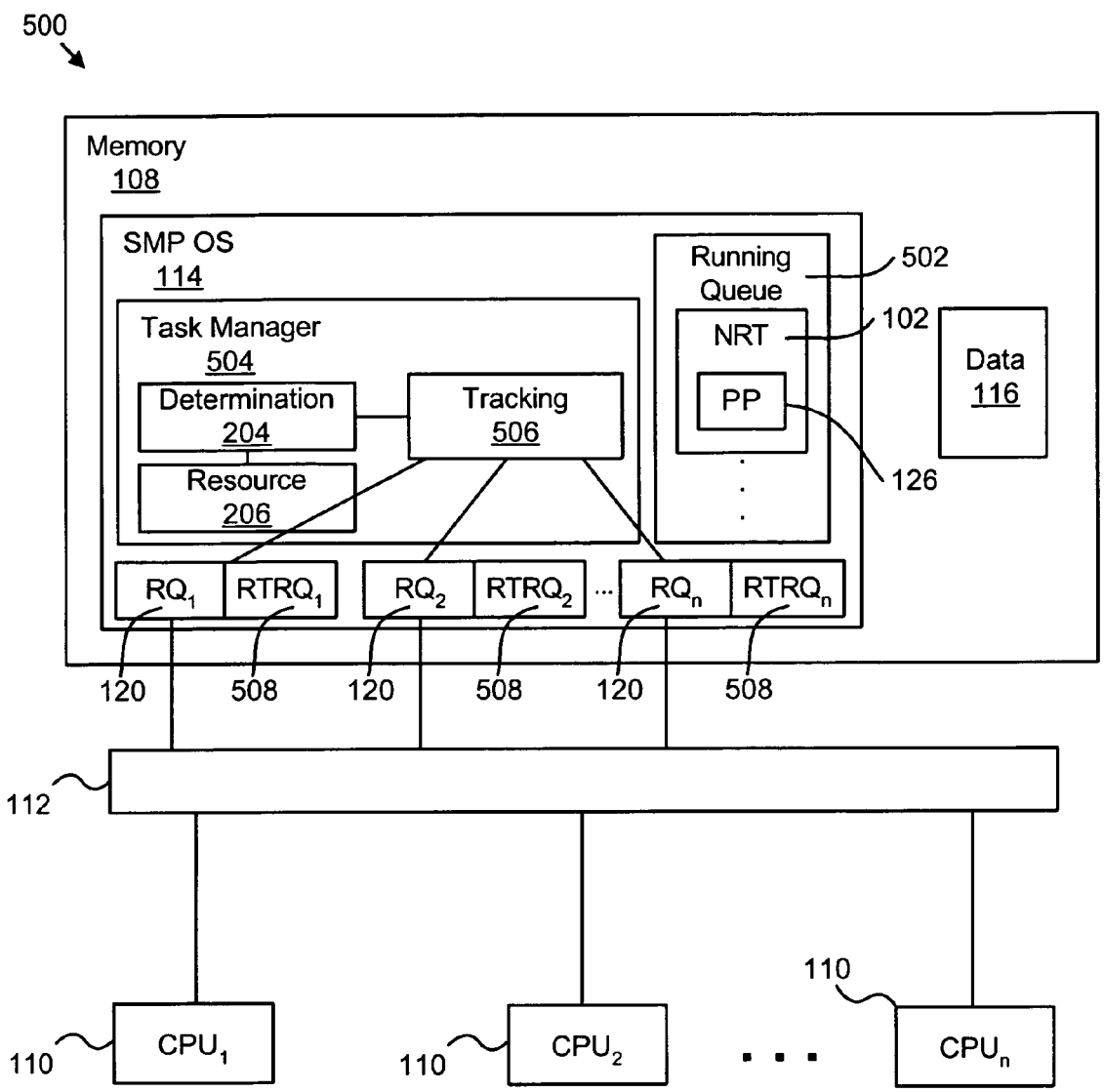
FIG. 5 is a schematic block diagram illustrating one embodiment of a system in accordance with the present invention.

FIG. 5 illustrates a system 500 for minimizing RT task latency and maximizing NRT throughput in a multi-processor environment. Reference is now made directly to FIG. 5 and indirectly to FIG. 3. The system 500 includes a memory 108, plurality of CPUs 110, and bus 112 that collectively function and perform substantially the same as like hardware described in relation to FIG. 1. The memory 108 includes an SMP OS 114, a data segment 116, and a runqueue (RQ) 120 associated with each CPU 110. The data segment 116 and RQs 120 are substantially similar to the like numbered components described above in relation to FIG. 1.

In contrast to FIG. 1, the SMP OS 114 includes a running queue 502 and a task manager 504 configured for minimizing RT task latency and maximizing NRT throughput. The running queue 502 tracks what tasks are running on which CPUs 110. The task manager 504 manages execution of both NRT tasks 102 and RT tasks 104 (See FIG. 1).

In one embodiment, the task manager 504 includes a determination module 204 and a resource manager 206 that function in substantially the same manner as similarly numbered components described above in relation to FIG. 2. In one embodiment, the task manager 504 comprises a scheduler for the SMP OS. The task manager 504 may be initiated directly or in response to an interrupt such as a clock interrupt. Once the task manager 504 is executed, it communicates with the determination module 204. The determination module 204 attempts to identify any RT tasks 104 on the system 500. If one is found, the determination module signals the tracking module 506.

The tracking module 506 determines whether the identified RT task 104 is runnable. As described in detail above, this may be accomplished using various techniques. In system 500, another technique is illustrated. The SMP OS 114 may include a separate Real-Time Run Queue (RTRQ) 508 for each CPU 110. Alternatively, a consolidated Real-Time Run Queue may store all runnable RT tasks 104 executing on any CPU 110 in the system 500.

The RTRQ 508 may be used to optimize scheduling where large numbers of tasks are processed such that task switching overhead is impacting task latency. The RTRQ 508 may store just RT tasks 104 that are runnable. Runnable NRT tasks 102 may continue to be stored on the RQs 120. With such a configuration, information about the type of task and its runnable status is implicit in the data structure RTRQ 508.

Consequently, once a RT task 104 is identified by the determination module 204, the tracking module 506 may quickly scan the RTRQs 508 for the system 500. If a RT task 104 is present on one of the RTRQs 508, the tracking module 506 may immediately stop scanning and communicate to a NRT task 102 to execute the preemption point 126. The task manager 504 may then switch tasks to the runnable RT task 104 once the preemption point 126 is executed. If a scan of the RTRQs 508 finds no tasks, the tracking module 506 similarly signals a bypass of a preemption point 126 for the NRT task 102.

In this manner, the tracking module 506 may reference a plurality of data structures (the RTRQs 508) very quickly to determine whether or not a preemption point 126 should be executed. Alternatively, in embodiments having a single RTRQ 508 storing all runnable RT tasks, the tracking module 506 determines whether or not to execute the preemption point 126 by referencing a single data structure (the single RTRQ 508). Preferably, the tracking module 506 stops scanning once a first runnable RT task 104 is found.

Figure 6A:
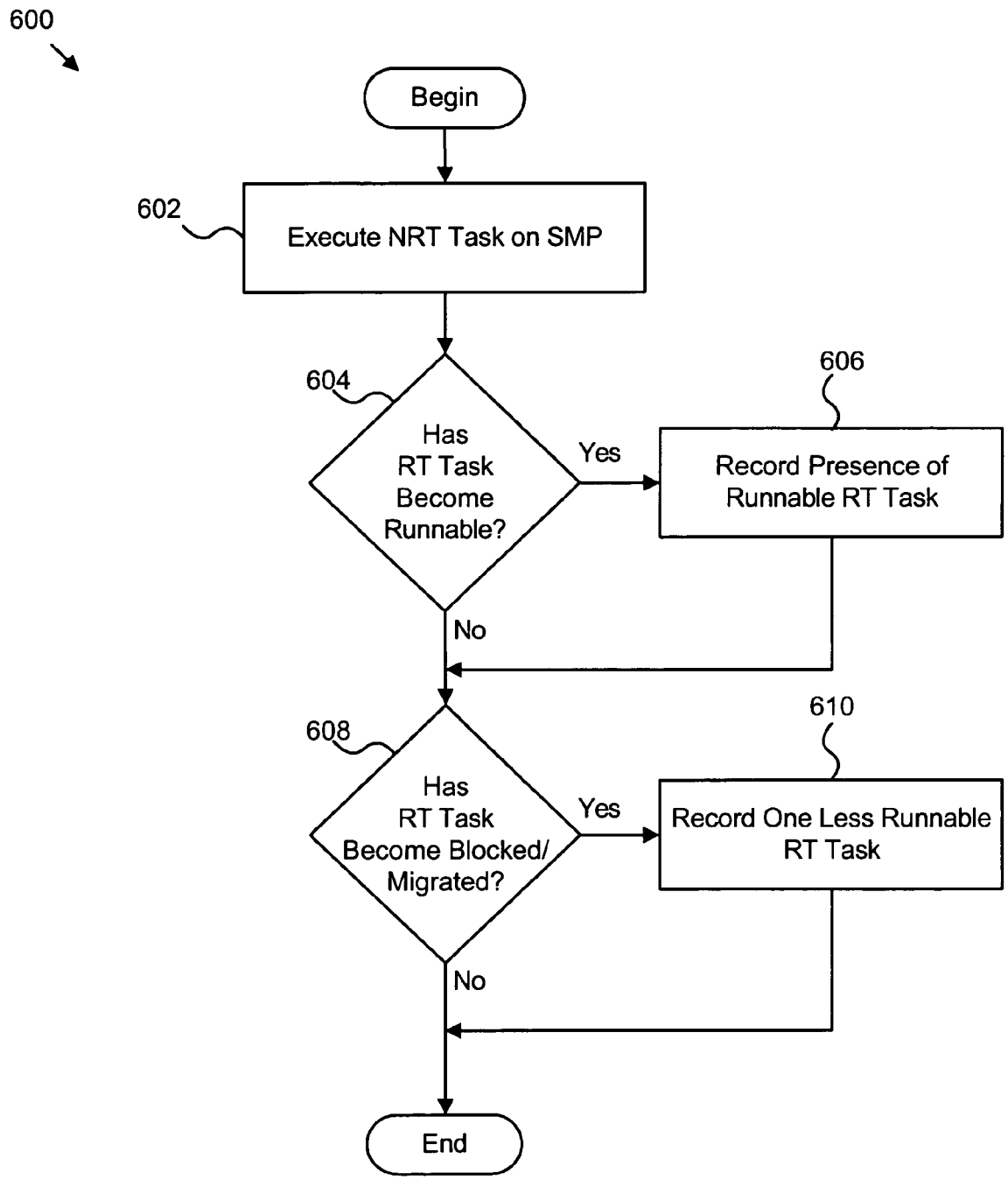
FIG. 6A is a schematic flow chart diagram illustrating certain steps for one embodiment of a method for minimizing RT task latency and maximizing NRT throughput in a multi-processor environment.

FIG. 6A illustrates a schematic flow chart diagram illustrating certain steps for one embodiment of a method 600 for minimizing RT task latency and maximizing NRT throughput in a multi-processor environment. The method 600 begins once a NRT task 102 is runnable on a SMP system 500 (See FIG. 5). First, the task manager 202 (See FIG. 2) executes 602 the NRT task 102 on the SMP system 500. Next, the determination module 204 attempts to identify a RT task 104 on one of the CPUs 110. In one embodiment, the determination module 204 references a queue or a task directory. The RT task 104 typically shares exclusive access to a resource with the NRT task 102.

The determination module 204 determines 604 if a RT task 104 in the SMP system 500 has become runnable. Preferably, this determination 604 may include whether the RT task 104 shares exclusive access to a resource 106 with the NRT task 102. Alternatively, sharing of exclusive access to a resource 106 between NRT tasks 102 and RT tasks 104 may be presumed.

If a RT task 104 has become runnable, the determination module 204 records 606 that a runnable RT task 104 was identified. As discussed above, recording this information may be accomplished a variety of ways. In one embodiment, the determination module 204 communicates with a tracking module 302. The tracking module 302 monitors the RT task 104 until the RT task 104 becomes runnable. Preferably, the tracking module 302 performs a monitoring check each time a scheduler/task manager 202 for the SMP OS 114 executes on a CPU 110. Preferably, the tracking module 302/402 increments a global counter 304 and/or processor-specific counters 404 to indicate identification of one or more runnable RT tasks 104.

In addition, the determination module 204 may also determine 608 whether one or more RT tasks 104 being managed by the SMP OS 114 have become blocked. As described above, a blocked RT task 104 does not benefit from NRT task preemption points.

If the RT task 104 has become blocked, the determination module 204 records 610 that one less runnable RT task 104 is now present. The determination module 204 may communicate with a tracking module 304/402 which decrements a global counter 304 and/or processor-specific counters 404 to indicate the presence of one less runnable RT task 104.

In certain embodiments, the determination module 204 may determine 608 whether a RT task 104 has been moved from one CPU 110 to another. If so, the determination module 204 records 610 the migration. The determination module 204 may communicate with a tracking module 304/402 which decrements a global counter 304 and adjusts processor-specific counters 404, as described above, to indicate that one runnable RT task 104 has migrated between CPUs 110.

Finally, the steps 602-610 end when the determination module 204 and task manager 202 have finished scheduling operations for the SMP OS 114. Subsequent steps in the method 600 may be completed by other modules. Specifically, logic in each NRT task 102 may selectively determine whether to execute a preemption point. Alternatively, such logic may reside centrally for example in a tracking module 302.

Figure 6B:
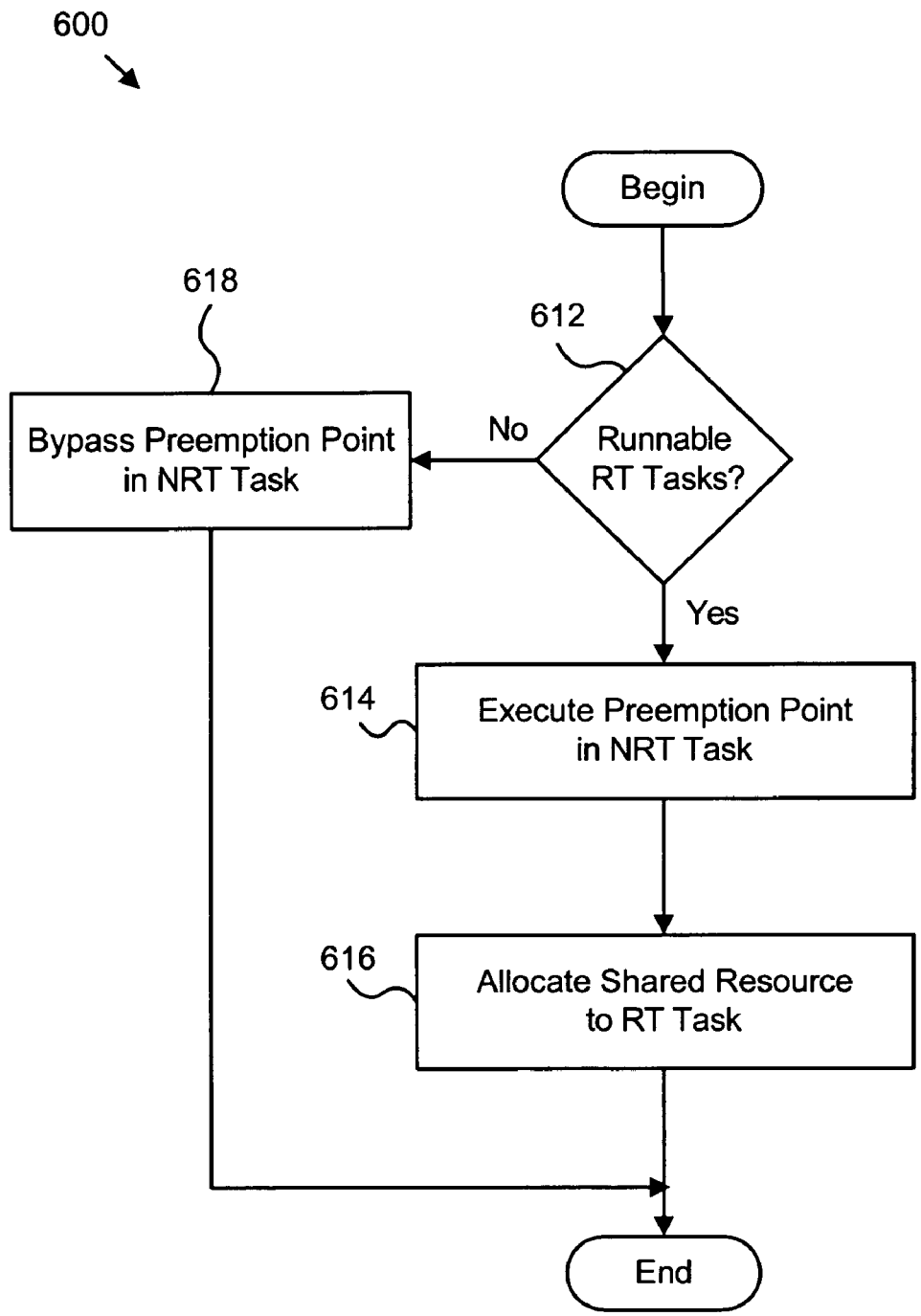
FIG. 6B is a schematic flow chart diagram illustrating certain additional steps for one embodiment of a method for minimizing RT task latency and maximizing NRT throughput in a multi-processor environment.

Referring now to FIG. 6B, additional steps in the method 600 may be initiated once a NRT task 102 comes to a preemption point 126. Preferably, these steps are completed by the NRT tasks 102. Alternatively, a tracking module 302/402 communicates with the NRT task 102 to indicate whether the NRT task 102 should execute the preemption point 126.

In one embodiment, once a NRT task 102 reaches a preemption point 126, a determination 612 is made whether there are runnable RT tasks 104. In one embodiment, the determination 612 is made by quickly reading the global counter 304 and/or processor-specific counters 404. Those of skill in the art will readily recognize that the counters 304,404 that are consulted may vary depending on the implementation.

If the counters 304,404 indicate the presence of a RT task 104, in one embodiment, the NRT task 102 executes 614 the preemption point 126 for the NRT task 102. Preferably, this means that the shared resource 106 is released. Next, the resource manager 206 allocates 616 the shared resource 106 to the RT task 104 and the method 600 ends. Typically, once the method 600 ends, the method is re-initiated the next time the task manager 202, determination module 204, and tracking module 204 are executed. Consequently, step 602 (See FIG. 6A) may not execute a new NRT task 102 but continue executing existing NRT tasks 102.

If the counters 304,404 indicate no RT tasks 104, the NRT task 102 bypasses 618 the preemption point 126. Alternatively, a tracking module 302 may indicate to a NRT task 102 to bypass 618 the next preemption point 126. In this manner, preemption points 126 are conditionally implemented. Consequently, if no runnable RT tasks 104 exist, the NRT task 102 can attain higher throughput.

Advantageously, the present invention in various embodiments provides for minimizing RT task latency and maximizing NRT task throughput in a multi-processor environment. The present invention incurs a minimum overhead to check for runnable RT tasks that share exclusive access to resources with existing executing NRT tasks. The present invention provides conditional preemption points for NRT tasks 102. Consequently, if runnable RT tasks 104 exist a CPU 110 and/or exclusive resource 106 is provided for the RT task 104 to meet its RT task latency thresholds. In addition, if no runnable RT tasks 104 exist, NRT tasks 102 are not unnecessarily interrupted by preemption points 126. Accordingly, the NRT tasks 102 can achieve higher throughputs and responsiveness automatically. The present invention automatically accommodates RT tasks 104 and NRT tasks 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for automatically minimizing real-time (RT) task latency and maximizing non-real time (NRT) task throughput in a multi-processor environment, the apparatus comprising:
a task manager configured to execute a NRT task in a multi-processor environment, the NRT task configured to obtain exclusive access to a resource by obtaining a lock associated with the resource;
a determination module configured to identify a RT task within the multi-processor environment, the RT task sharing exclusive access to the resource with the NRT task by obtaining the lock when not obtained by the NRT task; and
a tracking module in communication with the NRT, the tracking module configured to increment a global indicator in response to an identified runnable RT task, wherein the NRT task executes the preemption point in response to the global indicator being nonzero, and wherein the global indicator is accessible to NRT tasks in the multi-processor environment;
wherein the NRT task is configured to selectively execute a preemption point in response to the RT task becoming runnable, the preemption point being based on a predetermined point of the NRT task when a stoppage of the execution of the NRT task can occur prior to completion of the NRT task,
wherein execution of the preemption point causes the lock to be released by the NRT task and made available to the RT task,
wherein the NRT task is further configured to bypass the preemption point and maintain the lock in response to the RT task becoming blocked, and
wherein the task manager, determination module, and tracking module each comprises at least one of logic hardware and executable code, the executable code being stored on one or more memory devices.

2. The apparatus of claim 1, further comprising a resource manager configured to allocate the resource to the RT task in response to execution of the preemption point for the NRT task.

3. The apparatus of claim 1, wherein the tracking module is further configured to decrement the global indicator, in response to the identified runnable RT task becoming blocked and wherein the NRT task bypasses the preemption point in response to the global indicator being zero.

4. The apparatus of claim 1, wherein the tracking module is configured to reference a data structure configured to identify runnable RT tasks within the multi-processor environment and wherein the NRT task executes the preemption point in response to a runnable RT task identified within the data structure.

5. The apparatus of claim 1, wherein the tracking module is configured to reference a plurality of data structures, each data structure configured to identify a RT task for a particular processor within the multi-processor environment, the RT task sharing exclusive access to the resource with the NRT task, and wherein the NRT task executes the preemption point in response to the presence of a runnable RT task in at least one of the data structures.

6. The apparatus of claim 1, wherein the resource comprises an indicator set by a RT task, the indicator signaling a NRT task to execute the preemption point.

7. An apparatus for automatically minimizing real-time (RT) task latency and maximizing non-real time (NRT) task throughput in a multi-processor environment, the apparatus comprising:
a task manager configured to execute a NRT task in a multi-processor environment, the NRT task configured to obtain exclusive access to a resource by obtaining a lock associated with the resource;
a determination module configured to identify a RT task within the multi-processor environment, the RT task sharing exclusive access to the resource with the NRT task by obtaining the lock when not obtained by the NRT task; and
a tracking module configured to selectively execute a predetermined preemption point of the NRT task in response to the RT task becoming runnable, the preemption point being based on a predetermined point of the NRT task when a stoppage of the execution of the NRT task can occur prior to completion of the NRT task, and to selectively bypass the preemption point of the NRT task in response to the RT task becoming blocked, wherein execution of the preemption point causes the lock to be released by the NRT task and made available to the RT task;
wherein the tracking module is further configured to increment a global indicator accessible to NRT tasks in the multi-processor environment, in response to an identified runnable RT task and wherein the NRT task executes the preemption point in response to the global indicator being nonzero, and
wherein the task manager, determination module, and tracking module each comprises at least one of logic hardware and executable code, the executable code being stored on one or more memory devices.

8. The apparatus of claim 7, further comprising a resource manager configured to allocate the resource to the RT task in response to execution of the preemption point for the NRT task.

9. The apparatus of claim 8, wherein the tracking module is further configured to reference a data structure configured to identify runnable RT tasks within the multi-processor environment and wherein the NRT task executes the preemption point in response to a runnable RT task identified within the data structure.

10. The apparatus of claim 8, wherein the tracking module is further configured to reference a data structure configured to identify runnable RT tasks within the multi-processor environment and wherein the NRT task bypasses the preemption point in response to the absence of a runnable RT task in the data structure.

11. The apparatus of claim 10, wherein the shared resource comprises an indicator set by a RT task, the indicator signaling a NRT task to execute the preemption point.

12. The apparatus of claim 7, wherein the tracking module is further configured to decrement the global indicator, in response to the identified runnable RT task becoming blocked and wherein the NRT task bypasses the preemption point in response to the global indicator being zero.

13. A system for automatically minimizing real-time (RT) task latency and maximizing non-real time (NRT) task throughput in a multi-processor environment, the system comprising:
- a plurality of processors managed by a Symmetric Multi-Processor Operating System (SMP OS) executing within a memory that includes executable code and data;
- a bus configured to enable electronic communication between the processors and the memory;
- wherein the memory comprises a run queue for each processor, a running queue, and a task manager configured to execute a NRT task, the NRT task configured to obtain exclusive access to a resource via a lock associated with the resource, the task manager comprising,
- a determination module configured to identify a RT task within the SMP OS, the RT task sharing exclusive access to the resource with the NRT task via the lock; and
- a tracking module configured to selectively execute a predefined preemption point of the NRT task in response to the RT task becoming runnable to release the lock from the NRT task to the RT task and to bypass the preemption point in response to the RT task becoming blocked to maintain the lock with the NRT task;
- wherein the tracking module maintains a global indicator such that the global indicator is nonzero if a RT task is runnable and zero if no RT tasks are runnable, the tracking module being configured to increment the global indicator in response to an identified runnable RT task and configured to execute the predefined preemption point in response to the global indicator being nonzero.

14. The system of claim 13, wherein the memory further comprises a resource manager configured to allocate the resource to the RT task in response to execution of the preemption point for the NRT task.

15. The system of claim 13, wherein the task manager is further configured to switch to the RT task in response to execution of the preemption point.

16. A method for automatically minimizing real-time (RT) task latency and maximizing non-real time (NRT) task throughput in a multi-processor environment, the method comprising:
- executing a NRT task in a multi-processor environment, the NRT task configured to obtain exclusive access to a resource by obtaining a lock associated with the resource;
- identifying a RT task within the multi-processor environment, the RT task sharing exclusive access to the resource with the NRT task by obtaining the lock when not obtained by the NRT task;
- selectively executing a predetermined preemption point for the NRT task in response to the RT task becoming runnable, wherein execution of the preemption point causes the lock to be released by the NRT task and made available to the RT task;
- selectively bypassing the preemption point for the NRT task in response to the RT task becoming blocked, wherein bypassing the preemption point allows the NRT task to maintain the lock; and
- incrementing a global indicator accessible to NRT tasks in the multi-processor environment, in response to an identified runnable RT task and wherein the preemption point is executed in response to the global indicator being nonzero.

17. The method of claim 16, further comprising allocating the resource to the RT task in response to execution of the preemption point for the NRT task.

18. The method of claim 16, further comprising decrementing the global indicator, in response to the identified runnable RT task becoming blocked and wherein the preemption point is bypassed in response to the global indicator being zero.

19. The method of claim 16, further comprising referencing a data structure configured to identify runnable RT tasks within the multi-processor environment and wherein the preemption point is executed in response to a runnable RT task identified within the data structure.

20. The method of claim 16, further comprising referencing a plurality of data structures, each data structure configured to identify a RT task for a particular processor within the multi-processor environment, the RT task sharing exclusive access to the resource with the NRT task and wherein the preemption point is executed in response to the presence of a runnable RT task in at least one of the data structures.

21. The method of claim 16, wherein the shared resource includes an indicator set by a RT task, the indicator signaling a NRT task to execute the preemption point.

22. The method of claim 16, further comprising;
- incrementing a processor-specific indicator accessible to NRT tasks on a first processor, in response to an identified runnable RT task on the first processor;
- incrementing a global indicator accessible to NRT tasks in the multi-processor environment, in response to the processor-specific indicator being incremented to one;
- selectively decrementing the processor-specific indicator, in response to the identified runnable RT task on the first processor becoming blocked and moving to a second processor;
- decrementing the global indicator, in response to the processor-specific indicator being is decremented to zero;
- wherein the preemption point of the NRT task executing on the first processor is executed, in response to the processor-specific indicator or the global indicator being nonzero; and
- wherein the preemption point of the NRT task executing on the first processor is bypassed, in response to the processor-specific indicator and the global indicator being zero.

23. A computer readable storage medium tangibly embodying a program of machine-readable instructions executable by a digital processing apparatus to perform operations to automatically minimize real-time (RT) task latency and maximize non-real time (NRT) task throughput in a multi-processor environment, the operations comprising:
- an operation to execute a NRT task in a multi-processor environment, the NRT task configured to obtain exclusive access to a resource by obtaining a lock associated with the resource;
- an operation to identify a RT task within the multi-processor environment, the RT task sharing exclusive access to the resource with the NRT task by obtaining the lock when not obtained by the NRT task;
- an operation to selectively execute a predefined preemption point for the NRT task in response to the RT task becoming runnable, wherein execution of the preemption point causes the lock to be released by the NRT task and made available to the RT task;
- an operation to bypass the preemption point for the NRT task in response to the RT task becoming blocked, wherein bypassing the preemption point allows the NRT task to maintain the lock; and
- an operation to increment a global indicator accessible to NRT tasks in the multi-processor environment, in response to an identified runnable RT task and wherein the preemption point is executed in response to the global indicator being nonzero.

24. The computer readable storage medium of claim 23, further comprising an operation to bypass the preemption point for the NRT task in response to the RT task becoming blocked.

25. An apparatus for automatically minimizing real-time (RT) task latency and maximizing non-real time (NRT) task throughput in a multi-processor environment, the apparatus comprising:

means for executing a NRT task in a multi-processor environment, the NRT task configured to obtain exclusive access to a resource by obtaining a lock associated with the resource;

means for identifying a RT task within the multi-processor environment, the RT task sharing exclusive access to the resource with the NRT task by obtaining the lock when not obtained by the NRT task;

means for selectively executing a predefined preemption point for the NRT task in response to the RT task becoming runnable, wherein execution of the preemption point causes the lock to be released by the NRT task and made available to the RT task;

means for selectively bypassing the preemption point for the NRT task in response to the RT task becoming blocked, wherein bypassing the preemption point allows the NRT task to maintain the lock;

means for incrementing a global indicator accessible to NRT tasks in the multi-processor environment, in response to an identified runnable RT task and wherein the preemption point is executed in response to the global indicator being nonzero;

wherein each of the means comprises at least one of logic hardware and executable code, the executable code being stored on one or more memory devices.

* * * * *